3,737,409
COPOLYCARBONATE OF BIS-3,5 - DIMETHYL-4-HYDROXYPHENYL) SULFONE WITH BISPHENOL-A
Daniel W. Fox, Pittsfield, Mass., assignor to General Electric Company
No Drawing. Continuation-in-part of application Ser. No. 7,978, Feb. 2, 1970, which is a continuation of application Ser. No. 622,074, Mar. 10, 1967, both now abandoned. This application Mar. 8, 1971, Ser. No. 122,165
Int. Cl. C08g 17/13
U.S. Cl. 260—49     4 Claims

ABSTRACT OF THE DISCLOSURE

A copolymer of the reaction product of (1) bis-(3,5-dimethyl-4-hydroxyphenyl) sulfone, (2) 2,2-bis-(4-hydroxyphenyl) propane and (3) a carbonate precursor wherein the reaction mixture of (1) and (2) are initially 40–99 weight percent of (1) and correspondingly 60–1 weight percent of (2). In addition, this invention is directed to a high heat distortion, orientable textile fiber of the copolymer set forth above.

---

This application is a continuation-in-part of copending application Ser. No. 7,978, filed Feb. 2, 1970, which in turn is a continuation of application Ser. No. 622,074, filed Mar. 10, 1967, both now abandoned.

This invention relates to a copolymer of a particular sulfone material and an aromatic dihydric phenol. More specifically, it relates to a fiber prepared from the copolymer of the particular aromatic sulfone and the particular aromatic dihydric phenol.

Previously, it has been known to prepare aromatic carbonate homopolymer resin by reacting 2,2-bis-(4-hydroxyphenyl) propane with phosgene. The resulting polymer is known as a polycarbonate resin having excellent properties of high glass transition temperatures and high impact strength. However, the polycarbonate resin does not lend itself to be formed into a useful textile fiber. It does not crystallize readily enough or to a sufficient extent to gain dry cleaning solvent resistance. Additionally, it undergoes some hydrolytic degradation when washed in alkaline media and the stick temperature is too low for convenient ironing. Much development work has been directed toward inducing the requisite crystallinity in the polycarbonates in order to obtain the desired properties. This activity has only been partially successful. Therefore, it has been surprisingly discovered that by preparing a copolymer of 2,2-bis-(4-hydroxyphenyl) propane and a particular aromatic dihydric phenol sulfone, the copolymer lends itself very nicely to the preparation of textile fibers. In addition, the copolymer has an extremely high heat distortion temperature and melting point compared to that of an aromatic polycarbonate as described above. Further, the special copolymer of this invention exhibits a much higher degree of hydrolytic stability than the polycarbonates.

Therefore, it is an object of this invention to prepare a novel aromatic copolymer of a dihydric phenol and a particular aromatic dihydric phenol sulfone.

Yet another object of this invention is to prepare a textile fiber employing the copolymer herein disclosed.

Other objects of this invention and advantages thereof will become apparent from the following detailed description thereof.

Briefly, according to this invention, the foregoing and other objects are attained by reacting bis-(3,5-dimethyl-4-hydroxyphenyl) sulfone with another bisphenol 2,2-bis-(4-hydroxyphenyl) propane to form the copolymer thereof which can be used to prepare a high heat distortion polymer which may be converted into an orientable textile fiber. Heretofore, it has been known to prepare copolymers of a bisphenol and a dihydroxy diphenyl sulfone or to prepare homopolymers of a dihydroxy diphenyl sulfone. This has been described in U.S. Pat. 3,271,367. However, the particular sulfone employed in the practice of this invention has not been fully appreciated or disclosed by the above prior art. The particular sulfone employed in the practice of this invention to prepare the copolymer herein described is bis-(3,5-dimethyl-4-hydroxyphenyl) sulfone. The preparation of the homopolymer of the particular dihydroxy diphenyl sulfone resulted in a polymer which has a pronounced tendency to crystallize, could not be melted and could not be dissolved. Therefore, the homopolymer is, per se, not useful. However, when reacting the bis-(3,5-dimethyl-4-hydroxyphenyl) sulfone even with minor amounts of a bisphenol such as 2,2-bis-(4-hydroxyphenyl) propane, useful polymers are formed having high heat distortion temperatures, high melting temperatures and greatly enhanced hydrolytic stability.

The following examples are set forth to illustrate more clearly the principle and practice of this invention to those skilled in the art. Unless otherwise specified, where parts are mentioned, they are parts by weight.

EXAMPLE I

To a reaction vessel fitted with a stirrer, 1.5 grams of 2,2-bis-(4-hydroxyphenyl) propane (known as bisphenol-A) and 13.5 grams of bis-(3,5-dimethyl-4-hydroxyphenyl) sulfone are added. The flask contains 25 ml. of pyridine and 100 ml. of methylene chloride. Phosgene is then bubbled through the mixture at a rate of about 0.5 gram per minute at room temperature and atmospheric pressure for a period of about 30 minutes. The reaction is stopped and the resin is precipitated by slowly adding to the reaction mixture, a 1:1 mixture of acetone and methanol while maintaining vigorous agitation. A stringy precipitate is formed.

The resulting copolymer is soluble in hot tetrachloroethane (100° C.) and upon preparing a film cast from a solution thereof a colorless, transparent tough film is formed. Upon placing the film in an oven at 250° C. for a period of approximately ten hours, no color or dimensional change is noticed.

EXAMPLES II–V

Example I is repeated and in each case the weight of the bis-(3,5-dimethyl-4-hydroxyphenyl) sulfone and bisphenol-A employed in the feed mixture is as indicated in the table with the hydrolytic stability testing of the films as follows:

| Example | Weight percent of— | | Hydrolytic stability as weight loss after 24 hours in 10% NaOH solution at 75° C., percent |
|---|---|---|---|
| | Sulfone | Bisphenol-A | |
| II | 92 | 8 | >1 |
| III | 75 | 25 | >1 |
| IV | 50 | 50 | >1 |
| V | 40 | 60 | 8.5 |

The films of Examples II–IV were still tough transparent films showing no signs of attack or degradation. The film of Example V is slightly hazy, showing that it is starting to be attacked or degraded by the NaOH solution.

EXAMPLE VI

Part A

Films are prepared as in Example I but using the composition of feed to prepare the copolymers of Examples III and IV above. These films are designated as Film A and Film B.

Part B

Example I is repeated except that in place of the bis-(3,5-dimethyl-4-hydroxyphenyl) sulfone employed herein, 4,4'-dihydroxyphenyl sulfone is employed herein to prepare two films, one of which is a copolymer of about 75 weight percent of 4,4'-dihydroxyphenyl sulfone and, correspondingly, about 25 weight percent of bisphenol-A in the feed mixture, which film is designated as Film C and other is a copolymer of about 50 weight percent of 4,4'-dihydroxyphenyl sulfone and about 50 weight percent of bisphenol-A in the feed mixture, which film is designated as Flm D.

Part C

Each of the films of Parts A and B of the above were tested for hydrolytic stability by immersion in a 10% NaOH solution at room temperature for about 72 hours. The results are as follows:

| Sample: | Hydrolytic stability as weight loss in percent |
|---|---|
| Film A (Example III) | >1 |
| Film B (Example IV) | >1 |
| Film C | 70 |
| Film D | Destroyed |

Films A and B after immersion in the NaOH solution are still tough transparent films showing no signs of degradation. Film C is white and oaque. Film D is completely destroyed.

EXAMPLE VII

Example I is repeated except that in place of the bis-(3,5-dimethyl-4-hydroxyphenyl) sulfone, bis-(3-methyl-4-hydroxyphenyl) sulfone is employed to prepare films of a copolymer structure of about 50 weight percent of bis-(3-methyl-4-hydroxyphenyl) sulfone and 50 weight percent of bisphenol-A as employed in the feed mixture. The film is then tested for hydrolytic stability by immersion in a 10% solution of NaOH at 75° C.

| | Weight loss in percent |
|---|---|
| After 2 hours | 14.8 |
| After 4 hours | 29.7 |
| At 17 hours | Destroyed |

EXAMPLE VIII

Example I is repeated except that the feed mixture to the reactor contains 84 weight percent of the sulfone and, correspondingly, 16 weight percent of the bisphenol-A.

The polymer so prepared herein is dissolved in methylene chloride to prepare a 15% solution thereof. The solution is then spun into a textile fiber by the wet spinning process using methanol in the spin bath. The fiber is taken up at 100 feet per minute. The fiber is dried at 100° C. for about 24 hours.

EXAMPLE IX

The fiber so produced in Example VIII is oriented to various degrees by drawing the fiber over a hot stage at various temperatures. The following results are obtained.

| | Draw temperature, °C. | Denier | Tenacity, grams/denier at room temp. | Elongations, prior to breaking at room temp., percent |
|---|---|---|---|---|
| Draw ratio: | | | | |
| 3:1 | 190 | 27.9 | 3.5 | 22.5 |
| 3.5:1 | 190 | 26.8 | 4.3 | 17.8 |
| 4:1 | 235 | 23.2 | 4.8 | 14.6 |
| 5:1 | 290 | 19.5 | 4.7 | 64.0 |
| As spun | | 100.0 | 0.7 | 6.0 |

From this example, it can be seen that the fibers have a very broad temperature of orientation and that the fiber oriented at the highest temperature has the highest elongation at room temperature.

This invention is directed to a particular copolymer composition and to a textile fiber prepared from the copolymer composition disclosed herein. The copolymer composition of this invention is prepared by copolymerizing bis-(3,5-dimethyl-4-hydroxyphenyl) sulfone with another dihydroxy bisphenol, 2,2-bis-(4-hydroxyphenyl) propane and a carbonate precursor. The resulting copolymer is found to have unusual qualities and properties far in excess of that known of a carbonate homopolymer prepared from 2,2-bis-(4-hydroxyphenyl) propane. When preparing film or orientable fibers from the copolymers of this invention unusual and surprising properties are obtained as shown by the examples. The films so prepared have a very broad orientation temperature and excellent elasticity when so oriented over this broad temperature range. In addition, the tenacity of the fibers as shown in Example IX is very excellent.

In the practice of this invention, the copolymer is prepared by reacting 40–99 weight percent of a bis-(3,5-dimethyl-4-hydroxyphenyl) sulfone with correspondingly 60–1 weight percent of 2,2-bis-(4-hydroxyphenyl) propane based on the weight of the reaction mixture of the two reactants or monomers. This mixture is reacted with a carbonate precursor. As shown by the examples, when employing less than 40 weight percent of the particular dihydroxydiphenyl sulfone, the resulting copolymer would have poor hydrolytic stability. Therefore, to obtain the surprisingly unique properties in the copolymer of this invention, at least 40 weight percent of the mixture of reactants or monomers must be the particular dihydroxydiphenyl sulfone.

The copolymers of this invention are soluble in such solvents as chloroform, tetrachloroethane, ortho dichlorobenzene, methylene chloride, etc. Low concentration solutions of the copolymer of this invention can be prepared at room temperature. Higher concentrations and particularly where the dihydroxydiphenyl sulfone content is high may require using a heated or hot solvent.

The carbonate precursor employed in the practice of this invention can be either carbonyl halide, a carbonate ester or a haloformate. The carbonyl halides which can be employed herein are carbonyl bromide, carbonyl chloride, carbonyl fluoride, etc. or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc.; di-(alkylphenyl) carbonates such as di-(tolyl) carbonate, etc.; di-(naphthyl) carbonate, di-(chloronaphthyl) carbonate, phenyl tolyl carbonate, chlorophenyl cholornaphthyl carbonate, etc. or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The reaction for preparing the copolymer when employing either a carbonyl halide or a bishaloformate is carried out in the presence of an acid acceptor, which acid acceptor may be either an organic or an inorganic compound. In addition, the reaction may be carried out in the presence of an organic or an aqueous medium. The organic acid acceptor as used herein can be a tertiary amine and include such materials as pyridine, triethylamine, dimethylaniline, tributylamine, etc. When employing an inorganic acid acceptor, one may use either a hydroxide, a carbonate, a bicarbonate or a phosphate of an alkali or alkaline earth metal.

The copolymer of this invention may also be prepared by reacting the particular sulfone and propane herein disclosed with a diaryl carbonate employing the transesterification process. Basically, this process involves the interaction between the reactants at elevated temperatures, Preferably, the elevated temperatures employed are from about 150° C. to about 300° C. or higher. Under these conditions, an ester interchange occurs. This type of process for preparing the copolymers disclosed herein is fully described in U.S. Pat. 3,153,008.

Because of its excellent properties of high heat distortion and hydrolytic stability, the copolymer finds many uses such as molding applications, extrusion applications, etc. Particularly useful, however, is the preparation of orientable textile fibers from the copolymer. In addition, films can be prepared from this copolymer, which films are tough and flexible and which are dimensionally stable at elevated temperatures.

It will thus be seen that the objects set forth above, among those made apparent from the preceding description are efficiently attained, and since certain changes may be made in carrying out the above process and in the composition set forth without departing from the scope of the invention, it is intended that all matters contained in the above description shall be interpreted as illustrative and not in a limiting sense.

What is claimed is:
1. A copolymer consisting of the reaction product of (1) bis-(3,5-dimethyl-4-hydroxyphenyl) sulfone, (2) 2,2-bis-(4-hydroxyphenyl) propane and (3) a carbonate precursor, wherein the reaction mixture of monomers (1) and (2) initially consist of 50–99 weight percent of the bis-(3,5-dimethyl-4-hydroxyphenyl) sulfone and, correspondingly, 50–1 weight percent of the 2,2-bis-(4-hydroxyphenyl) propane based on the total weight of monomers (1) and (2).

2. The copolymer of claim 1 wherein the carbonate precursor is phosgene.

3. A high heat distortion, orientable textile fiber of the copolymer of claim 1.

4. A flexible film of the copolymer of claim 1.

References Cited
UNITED STATES PATENTS 3,271,367   9/1966   Schnell et al. _____ 260—47

SAMUEL H. BLECH, Primary Examiner

U.S. Cl. X.R.

260—33.8 R, 47 XA; 264—210